G. G. CHUTE.
MIXER FOR GAS ENGINES.
APPLICATION FILED JUNE 28, 1916.

1,318,005.

Patented Oct. 7, 1919.

UNITED STATES PATENT OFFICE.

GEORGE G. CHUTE, OF PORTLAND, OREGON.

MIXER FOR GAS-ENGINES.

1,318,005.  Specification of Letters Patent.  Patented Oct. 7, 1919.

Application filed June 28, 1916. Serial No. 106,525.

*To all whom it may concern:*

Be it known that I, GEORGE G. CHUTE, a citizen of the United States, residing in the city of Portland, county of Multnomah, and State of Oregon, have invented certain new and useful Improvements in Mixers for Gas-Engines, of which the following is a specification.

My invention relates to mixers for gas engines, and more particularly to a device especially designed to make use of the heat generated in the exhaust manifold for converting water into steam and also for heating air, with means for conveying a mixture of steam and hot air into the intake manifold of an engine, whereby to increase the efficiency of the engine, especially under speed. This mixture of hot air and steam in the engine, while it makes a thinner explosive mixture, keeps the engine clean of carbon and also makes possible more mileage per gallon of gasolene or distillate, which ever may be used, under speed.

My invention is attached as an auxiliary feature to the engine and can be controlled by any suitable lever mechanism placed within convenient reach of the operator. When the engine is running slowly the usual mixture from the carbureter only is used, but under speed, with the use of my steam and hot air mixer, greatly increased mileage can be secured.

My invention is readily adapted to any gas or internal combustion engine without material change or reconstruction thereof.

In order that others may more fully understand by invention I have illustrated one practical embodiment thereof in the accompanying sheet of drawings, which I will now describe.

Figure 1:
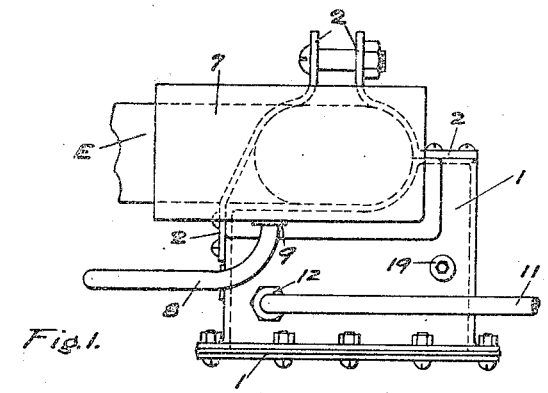
Figure 2:
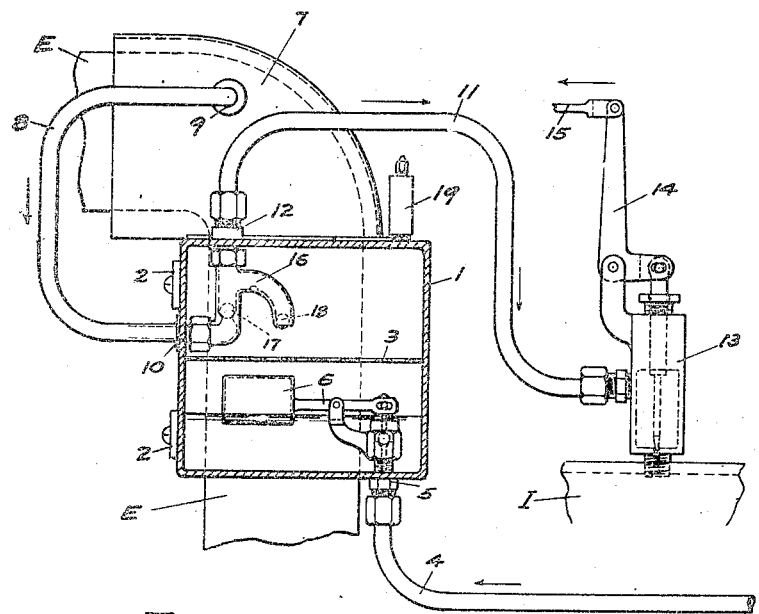

Figure 1 is a top plan view of my invention as applied to the exhaust pipe, or manifold, of an engine; and Fig. 2 is a side elevation thereof, partly in section to show the interior construction and arrangement.

Referring now more in detail to the drawings, E designates the exhaust manifold, or pipe, of a gas engine; I designates a fragmentary portion of the intake manifold.

My invention as here illustrated, comprises a metal box, or case, 1, adapted to be clamped against the exhaust manifold, or exhaust pipe, by means of clamp members 2—2, as indicated, whereby the heat from said exhaust pipe or manifold heats said box, or casing. A perforated partition member 3, is mounted across the middle of said box, or casing, as indicated in Fig. 2. A water pipe 4, from the water circulating system of the engine, is connected into the bottom of said box, or casing, 1, as at 5. A float valve mechanism 6, within the box, or casing, 1, controls the inlet of water into the lower part of the box, or casing, as will be clearly understood from Fig. 2 of the drawings. The details of this need not be described as any float valve mechanism may be used which will perform the function of controlling the inflow of water and maintaining it at a desired depth.

A hood, 7, is also formed over the exhaust pipe, or manifold E, as here shown, immediately above the box, or casing, 1. The object of said hood is to gather heated air around the exhaust manifold. A pipe 8, is connected with said hood, as at 9, and is also connected to the box, or casing, 1, above the perforated partition 3, as at 10. A pipe 11, is connected, as at 12, with the top of said box, or casing, 1, and at its opposite end is connected with a needle valve mechanism 13, connected to the intake manifold I, as clearly indicated in Fig. 2, said needle valve mechanism being operated by a bell crank 14, with which is connected an operating rod, or wire, 15, which may be extended to any convenient position for the operator.

Within the box, or casing, 1, above the perforated partition 3, is a three-way check valve member 16. Steam which has been generated in the lower part of the box, or casing, 1, passes into the upper part thereof through the perforated partition 3. The check valve member 16, is provided with a ball valve 17, at its connection with the pipe 8, whereby hot air from the hood 7, can be drawn into said check valve member, but back flow is prevented. Said check valve member is also provided with a ball valve 18, which permits the steam to be drawn into said check valve member and up through the pipe 11, but prevents back flow into the box, or casing, 1. Thus it will be clear from the drawing, that hot air from the hood 7, through the pipe 8, and steam from the upper part of the box, or casing, 1, can be drawn through the pipe 11, and through the needle valve 13, into the intake manifold I, whenever said needle valve is opened through the operating rod 15.

The partition member 3, in the box, or casing, prevents splashing of the water in the lower part of the box, or casing, 1, and at the same time limits the movement of the float valve 6. The float valve, of course, automatically regulates the amount of water admitted to the box, or casing, 1, from the water circulating system of the engine. The box, or casing, 1, is also provided with a puppet valve, 19, for the escape of steam therefrom in case the steam pressure should become sufficient to open said puppet valve.

I am aware that many changes in details can be made in my invention as here shown for purposes of illustration, without departing from the spirit thereof, and I do not, therefore, limit the invention to the particular showing made, except as I may be limited by the hereto appended claim forming a part thereof.

I claim:

In combination with an internal combustion engine and the exhaust and intake members thereof, a water box mounted on said exhaust member and having therein a water chamber and a steam chamber thereabove, with a perforated wall therebetween, valve-controlled water supply connections from said water chamber to the water circulating system of said engine, a supply pipe from the steam chamber of said box to said intake member, a hot air pipe provided with means for taking heated air from around said exhaust member and connected with said steam supply pipe leading to said intake member, and ball-check valves controlling the passage of steam and hot air through said steam and air supply pipe and preventing flow of steam back through said hot air pipe, said ball-valves being moved to open the passageways controlled by them by the suction through said pipes; and automatically operating by gravity to close said passageways, substantially as described.

Signed at Portland, Multnomah county, Oregon, this 22nd day of June, 1916.

GEORGE G. CHUTE.

In presence of—
I. M. GRIFFIN,
J. C. STRENG.